Aug. 24, 1954  F. M. CARROLL  2,687,090
MACHINE FOR PRINTING CONTINUOUS FORMS
Filed March 1, 1949  9 Sheets-Sheet 4

INVENTOR
Fred M. Carroll
BY
Robert S. Dunham
ATTORNEY

Aug. 24, 1954          F. M. CARROLL              2,687,090
              MACHINE FOR PRINTING CONTINUOUS FORMS
Filed March 1, 1949                           9 Sheets-Sheet 5
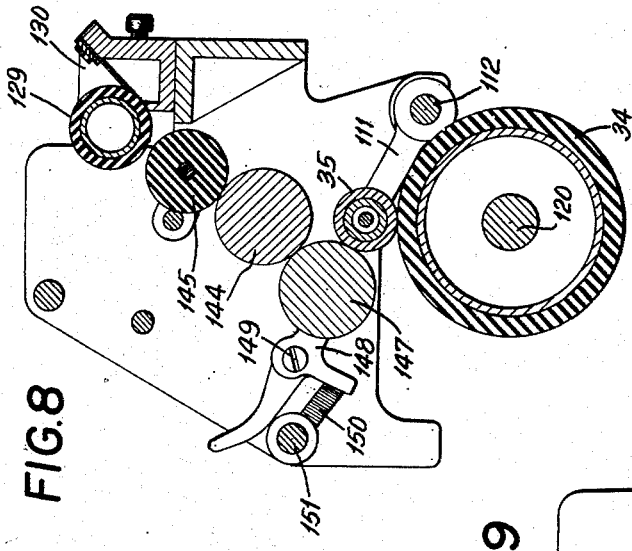
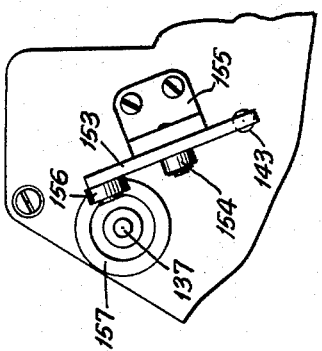
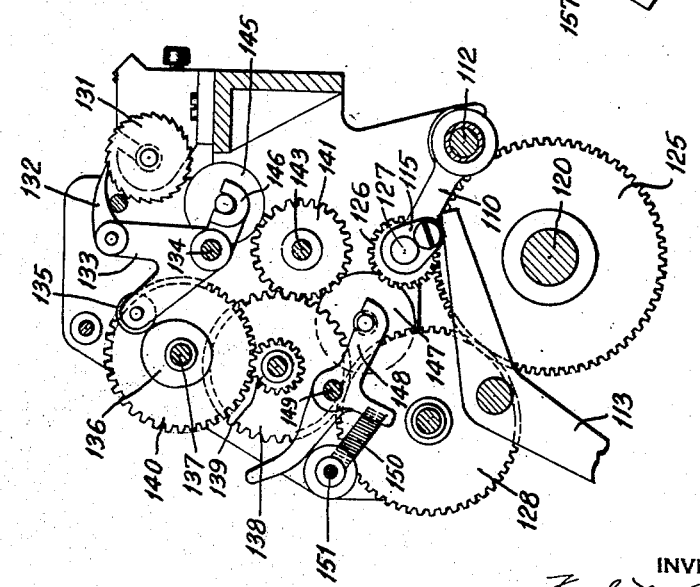
INVENTOR
Fred M. Carroll
BY
Robert S. Dunham
ATTORNEY Aug. 24, 1954　　　F. M. CARROLL　　　2,687,090
MACHINE FOR PRINTING CONTINUOUS FORMS
Filed March 1, 1949　　　　　　　　　　9 Sheets-Sheet 6
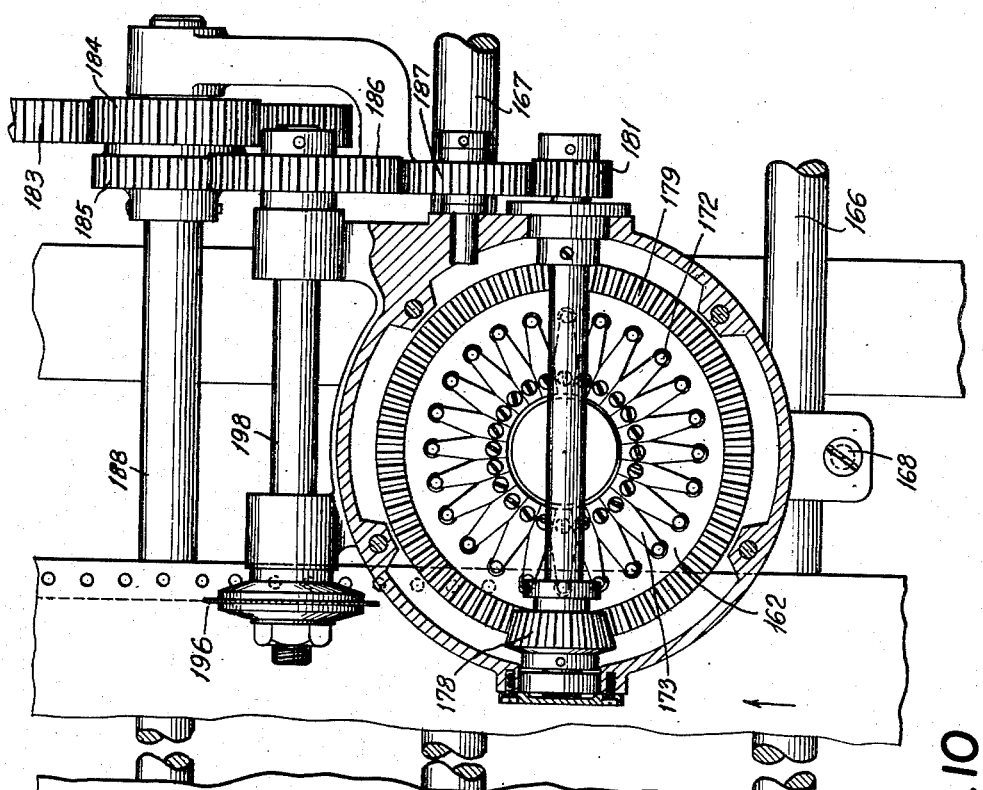
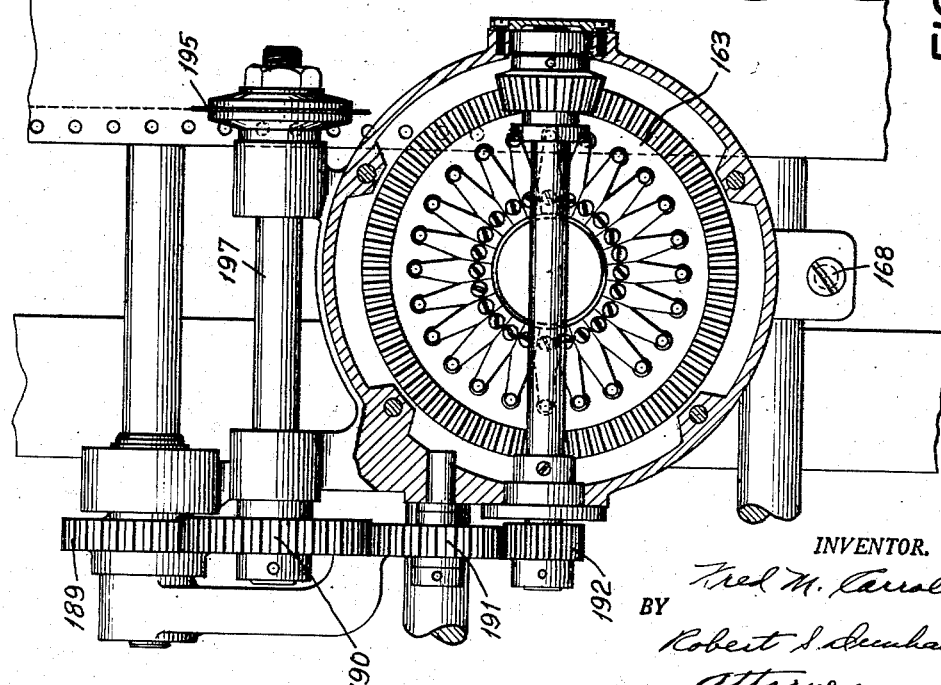
FIG. 10
INVENTOR.
Fred M. Carroll
BY Robert S. Dunham
Attorney Aug. 24, 1954     F. M. CARROLL     2,687,090
MACHINE FOR PRINTING CONTINUOUS FORMS
Filed March 1, 1949     9 Sheets-Sheet 7
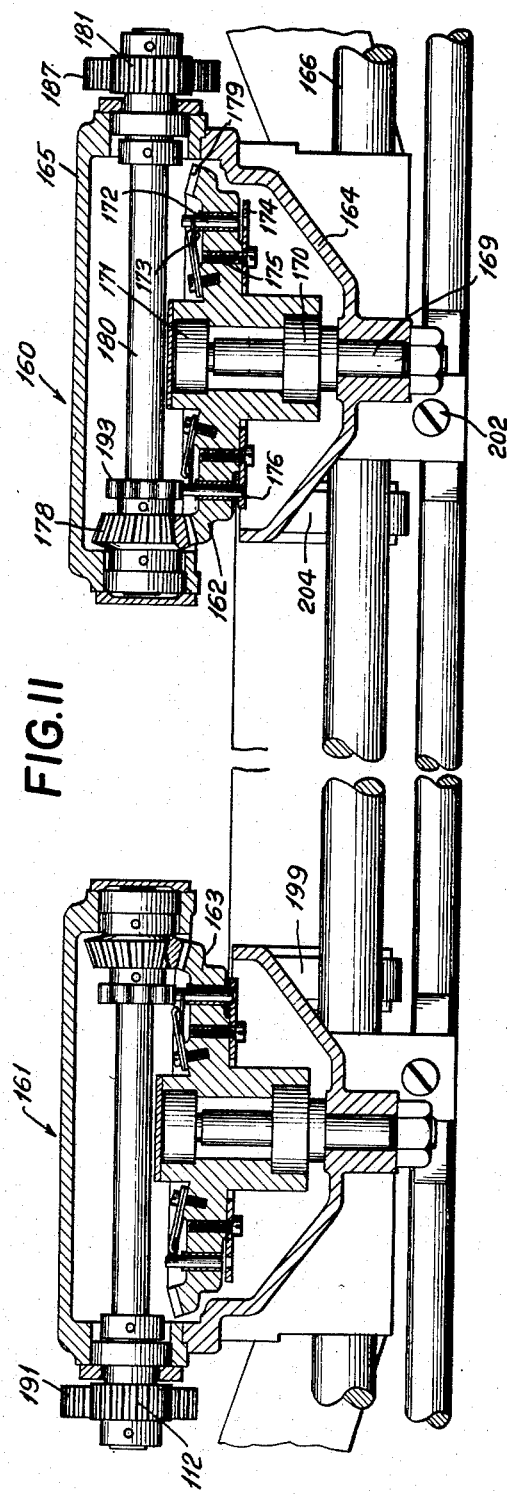
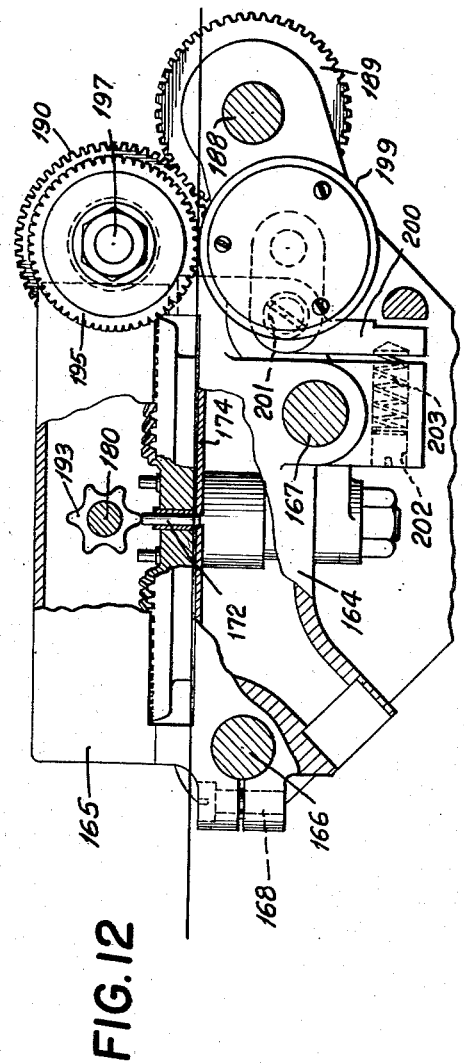
INVENTOR
Fred M. Carroll
BY
Robert S. Dunham
ATTORNEY

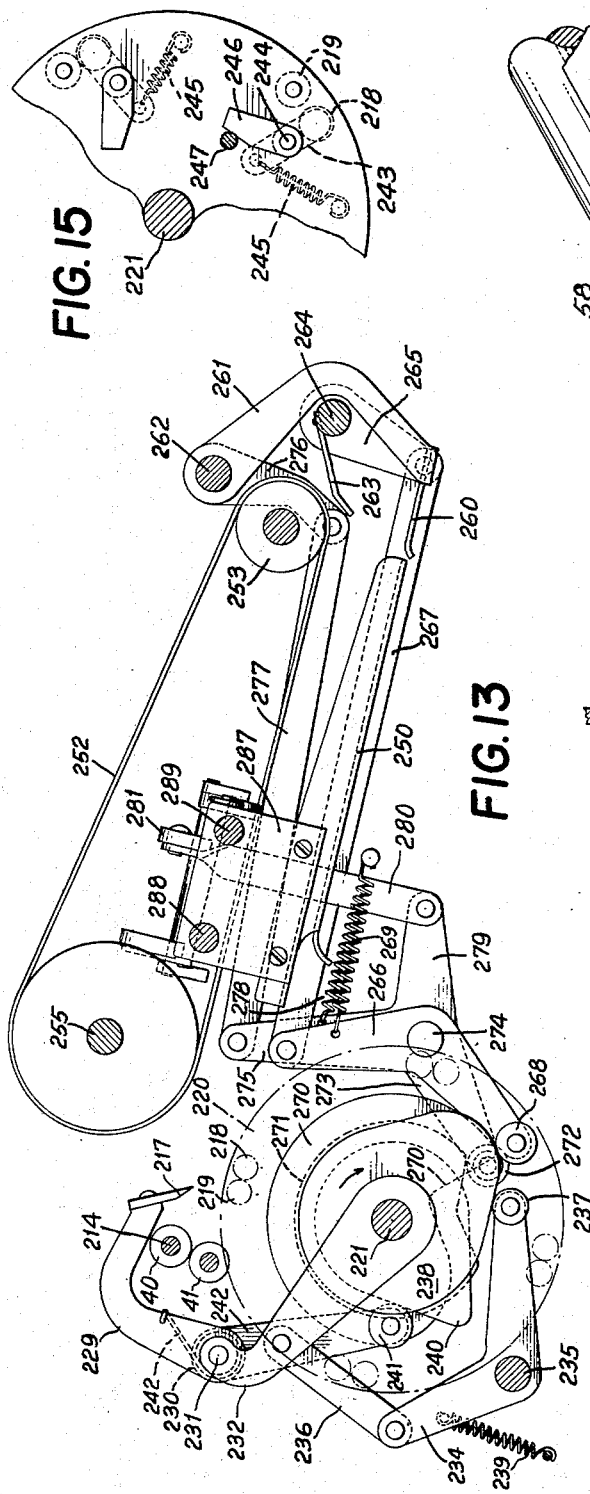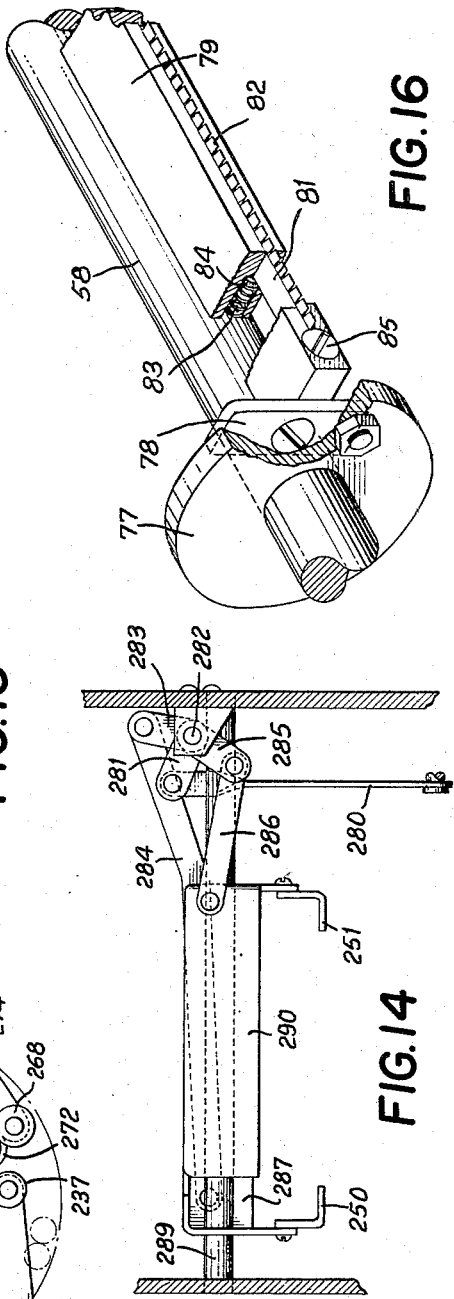

Aug. 24, 1954    F. M. CARROLL    2,687,090
MACHINE FOR PRINTING CONTINUOUS FORMS
Filed March 1, 1949    9 Sheets-Sheet 9
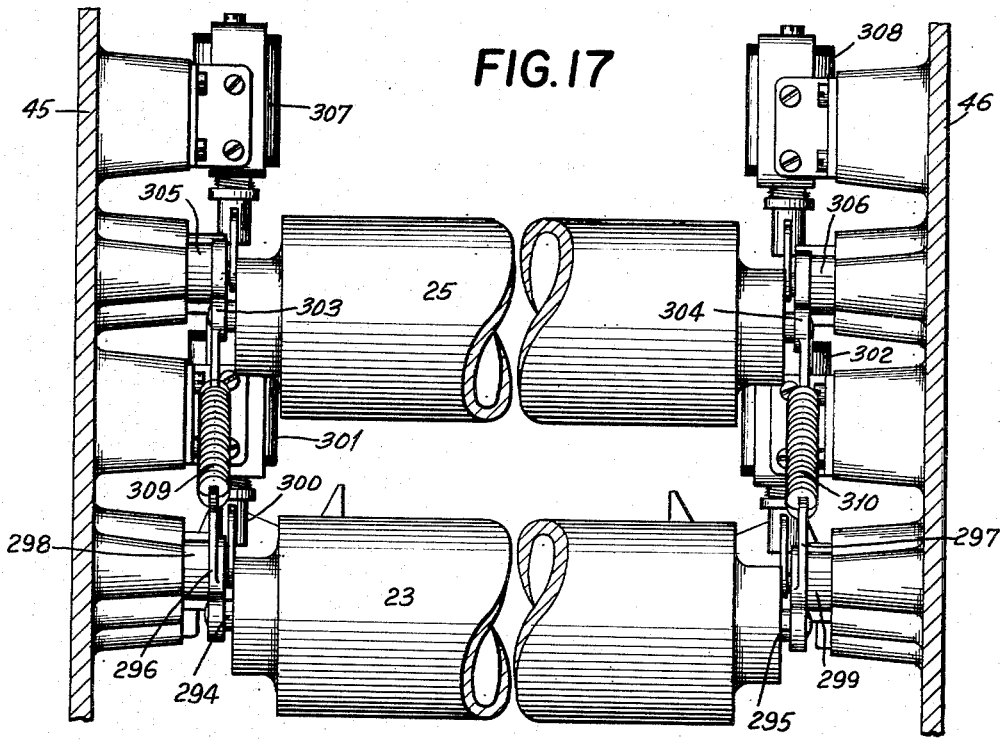
FIG. 17
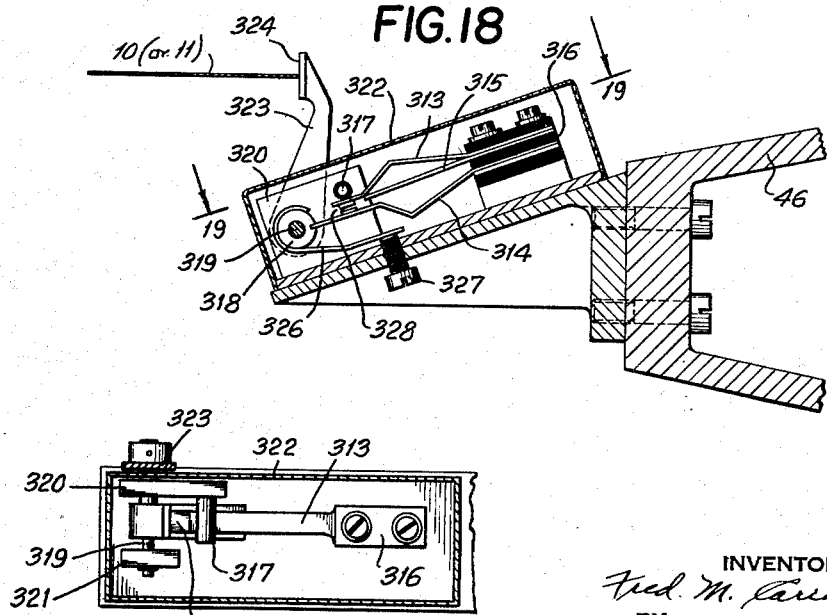
FIG. 18
FIG. 19
INVENTOR
Fred M. Carroll
BY
Robert S. Dunham
ATTORNEY Patented Aug. 24, 1954

2,687,090

UNITED STATES PATENT OFFICE 2,687,090

MACHINE FOR PRINTING CONTINUOUS FORMS

Fred M. Carroll, Binghamton, N. Y., assignor to International Business Machines Corporation, New York, N. Y., a corporation of New York Application March 1, 1949, Serial No. 78,936

16 Claims. (Cl. 101—227)

This invention relates to machines for producing a series of forms printed upon a strip of paper.

One of the principal objects of this invention is to provide a printing machine which is adapted to receive a strip of blank paper and to print forms arranged in sequence along the strip.

Among the objects of the invention is to provide a machine for printing parallel lines extending laterally across a continuous strip of paper in separated groups, each group having a preselected number of lines depending upon the number of items for which a form is to be provided, and means whereby the machine may be adjusted to print forms of different capacity and length.

Another object is to provide a printing mechanism which is adapted to receive a web of blank paper and a web of carbon paper and to score said webs for the purpose of sub-dividing them into a series of single forms.

Another object is to provide mechanism for establishing and laying two or more travelling strips or webs of paper in superposition with their edges coinciding so that they may subsequently be worked upon to produce duplicate copies of printed forms.

Another object is to provide a machine for printing multiple forms in series on superposed strips of paper and in which mechanism applies spots of adhesive along the edges of at least one of the strips and presses the strips together to cause marginal adherence of the strips.

Another object of the invention is to provide mechanism for punching rows of spaced perforations in a travelling strip of paper.

Another object is to provide feeding and folding mechanism for folding and stacking a continuous strip in zigzag fashion with each unfolded portion having a predetermined length for a particular run of the machine.

Another object of the invention is to produce a strip comprising a web of paper with printed forms and a carbon web glued together at intervals along the longitudinal edges of the strip and within marginal areas outside of longitudinally scored lines so that the carbon may subsequently be removed from the printed forms and in which the marginal areas of the joined strips are serially perforated for accommodating the feeding mechanism of apparatus with which the strip is to be used, said forms being horizontally and vertically ruled as desired and adjacent forms along the strips being delineated by scored lines whereby to facilitate separation of the attached forms.

Other objects of the invention will be pointed out in the following description and claims and illustrated in the accompanying drawings which disclose by way of example the principle of the invention and the best mode which has been contemplated for applying that principle.

In the drawings:

Fig. 7 is an elevational view of the driving mechanism for the printing lines across the strip;

Fig. 8 is a sectional view through the inking mechanism by which ink is provided to the marking cylinder for printing lines across the strip;

Fig. 9 illustrates a device by which an ink transfer roller is reciprocated for spreading the ink;

Fig. 10 is a plan of the drive for the punching mechanism and longitudinal line scoring mechanism;

Fig. 11 is a sectional view taken cross-wise of the punching mechanism;

Fig. 12 is a side elevational view showing one of the punching mechanisms partly in section;

Fig. 13 is a side elevational view of the folding mechanism;

Fig. 14 is a transverse view of the mechanism for guiding the strip in its passage through the folding mechanism;

Fig. 15 shows a detail of the strip gripping and releasing mechanisms of the drum;

Fig. 16 is a detail of the mechanism for scoring lines laterally of the strip;

Fig. 17 is an elevational view of the aligning mechanism shown in Fig. 2;

Fig. 18 shows a detail of one of the alignment controlling devices; and

Fig. 19 is a section on line 19—19 of Fig. 18.

Figure 4:
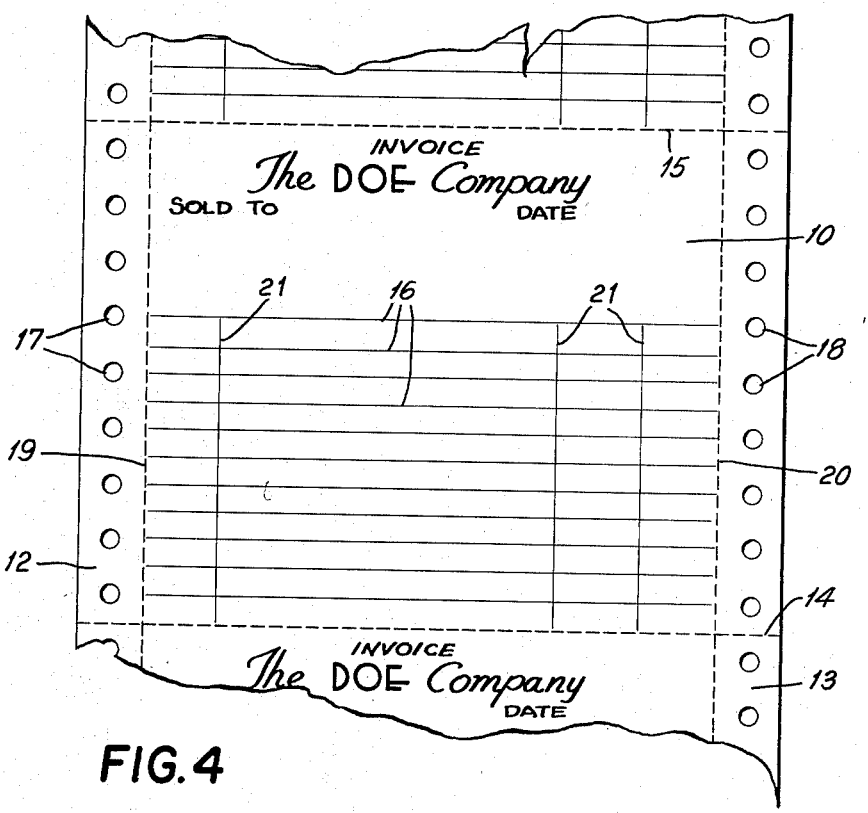
Fig. 4 illustrates a portion of a strip of paper prepared by the machine and showing one complete form.

A form of the product of the machine is illustrated in Fig. 4. This includes two superposed sheets or webs, a web of paper 10 and a web of carbon paper 11 (not shown in Fig. 4), which are fastened together along their marginal edges 12 and 13 by means of an adhesive which is applied during the first stages of the passage of the webs through the machine. The two webs are combined and thereafter the machine operations are performed on a single strip constituted of the combined webs.

The horizontal lines 14 and 15 are scored at predetermined distances apart which are determined by the length of the individual form or invoice desired. The captions and whatever other data desired are printed upon the surface of the plain paper in the proper locations. The horizontal lines 16 are printed in such number as are required for the particular length of the form which the machine is conditioned to prepare as the strip advances through the machine. The marginal areas 12 and 13 are punched to provide two series of holes 17 and 18 which are desired for feeding the strip through a machine such as a tabulating machine during subsequent use of the strip. The vertically scored lines 19 and 20, together with the horizontally scored lines 14 and 15 frame each printed form and provide for facilitating separation of the forms from each other and the detachment of the marginal areas 12 and 13. The vertical lines 21 are provided in such number as to produce a desired arrangement of columns for a desired form.

The several printing, scoring and punching operations are performed successively as the strip advances through the machine and then the machine stacks the strip by folding it on lines of fold corresponding with the horizontally scored lines 14 and 15. Although the invention will be described with reference to the arrangement of the various mechanisms for producing a single size of form, the machine is adapted to be adjusted and conditioned for producing forms of other lengths and widths.

Figure 2:
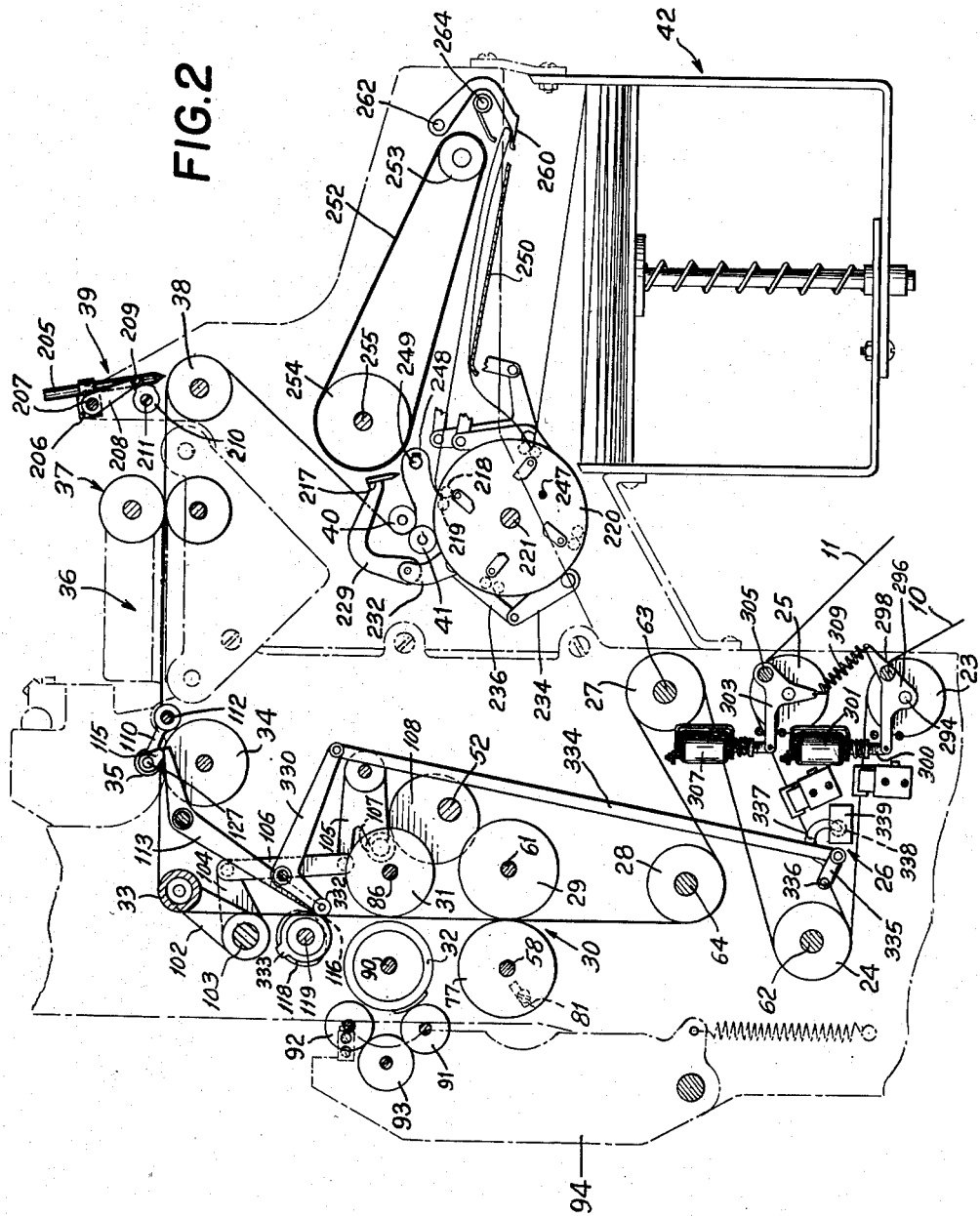
Fig. 2 is a general view showing the various feed rollers and the course of the webs of paper through the machine.

The course of the material through the machine is first described in general with reference to Fig. 2. A web of blank paper 10 and a web of carbon paper 11 are stored in the machine in conventional supply rolls (not shown). The supply rolls are restrained against free rotation and the webs are drawn from them by the machine. The plain paper 10 passes from its source of supply and over an aligning roller 23 and to a feed roller 24 where it comes together with the carbon paper 11 which has passed over an aligning roller 25. The two aligning rollers 23 and 25 are so supported as to be capable of varying the tension of one or another of the webs in order to assure that the webs are correctly superposed with respect to each other when they reach the roller 24, as will be described hereinafter. Before the carbon paper 11 reaches the roller 24 it passes a device 26 by which glue or other adhesive is applied to the marginal areas of the carbon paper. When the carbon paper and plain paper are brought together as they travel over roller 24, they are caused to adhere to each other and to continue on through the machine from this point as a single strip. Both webs of paper are subsequently advanced and operated upon simultaneously and are therefore referred to as a single strip.

From the feed roller 24 the strip passes over feed rollers 27 and 28, and alongside a smooth steel roller 29 of the horizontal scoring device 30. It then passes between a platen 31 and a printing roller 32 by which any desired caption or wording is printed. From the printing roller 32 the strip continues upwardly and over a roller 33. The roller 33 is supported on a fixed axis when the machine is conditioned to prepare forms of normal length, but is adapted to allow for increasing the speed of the strip past the printing roller 32 between printing impressions when the machine is conditioned to prepare forms of greater length or height. The roller 33 is mounted on a pivoted arm which is oscillated once for each form which is to be printed. The extent of its movement (or lack of movement) is such as to allow for the passage of the proper length of the strip past the printing and horizontal line-scoring mechanisms as these mechanisms rotate at constant speed.

From the roller 33 the strip passes between a platen 34 and a horizontal line printing cylinder 35 and then through the punching mechanism 36. Upon leaving the punching mechanism 36 the longitudinally scored lines 19 and 20 are impressed by a scoring device 37. The strip then passes over a platen 38 above which is mounted the ruling device 39 for printing lines longitudinally of the strip. The strip is then received between a pair of rollers 40, 41, from which it is fed to the folding and stacking mechanism, which folds the strip along the laterally scored lines 14 and 15 and deposits the folded strip into a stack 42.

The various feeding, line scoring, printing, punching and folding mechanisms are all driven from a single motor 43 and through intermediate trains of gearing which will now be described.

Figure 1:
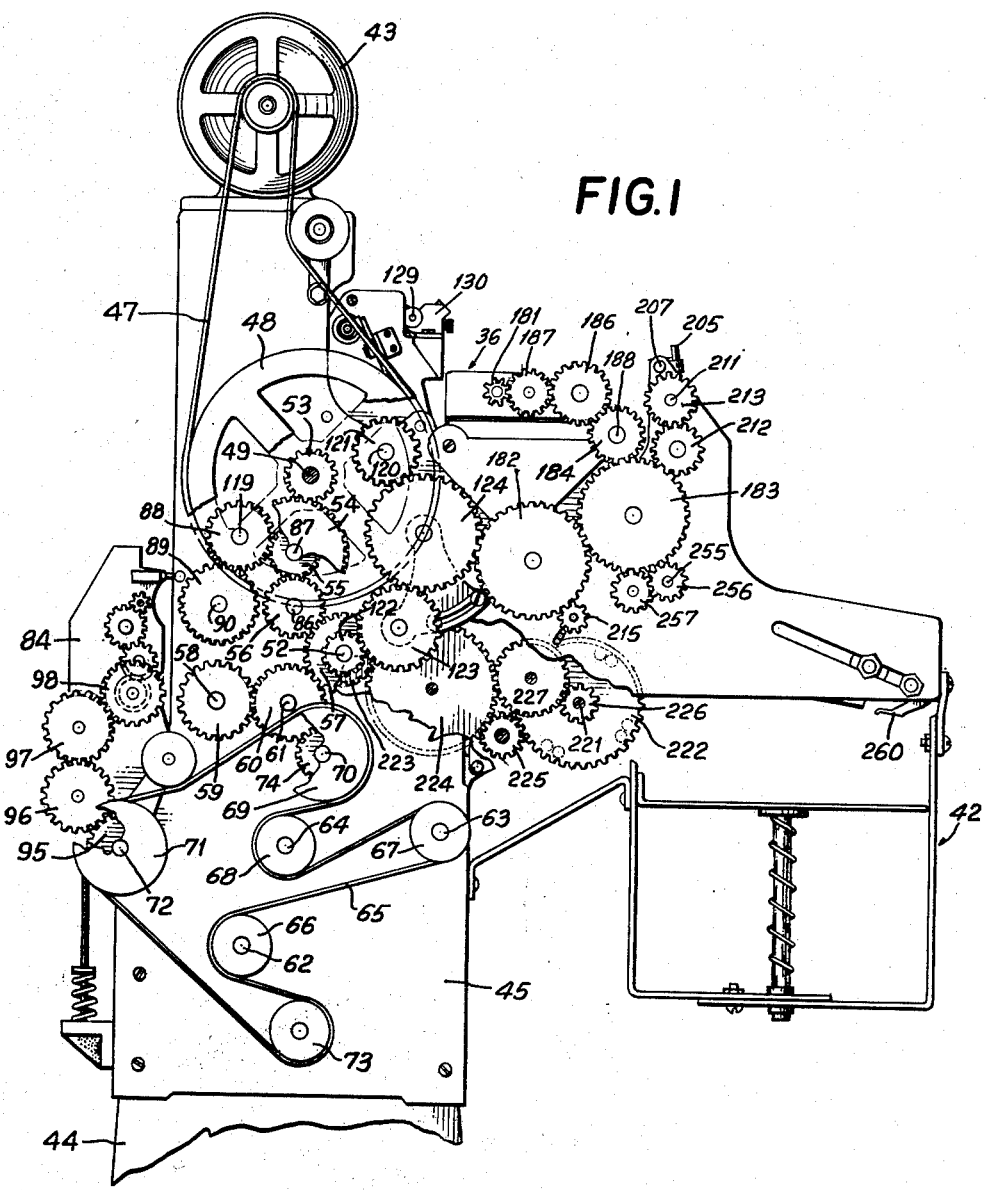
Fig. 1 is a general view of one side of the machine with parts broken away to illustrate the various driving mechanisms.

Having reference particularly to Fig. 1, the machine comprises a base 44 which supports the side frames 45, 46, and other covering plates. The motor 43 is suitably mounted on top of the machine and has a belt connection 47 to a pulley 48 which is carried by a shaft 49 from which the various trains of gearing are driven. All of the operating mechanisms and devices previously referred to, with the exception of the drive for the printing platen 31 and the printing roller 32, derive motion from a shaft 52, which is driven from shaft 49 through gears 53, 54, 55, 56 and 57, the latter being fixed to the shaft 52.

The horizontal line scoring device 30 is mounted upon the shaft 58 which carries a gear 59 which is driven from gear 57 through gear 60. The gear 60 is mounted upon shaft 61 upon which the smooth-faced roller 29 is mounted.

The feed rollers 24, 27 and 28, Fig. 2, are mounted on shafts 62, 63 and 64, respectively, which are driven by a belt 65, Fig. 1, which is trained over pulleys 66, 67 and 68 on shafts 62, 63 and 64, respectively, pulley 69 on shaft 70, pulley 71 on shaft 72, and an idler pulley 73. The shaft 70 carries a gear 74 which meshes with the gear 60 and is driven thereby. The strip, constituted of the united webs 10 and 11, Fig. 2, engages the rollers 24, 27 and 28 on shafts 62, 63 and 64, respectively, which rotate to help draw the webs of paper from their supply rolls.

*The mechanism for scoring lines crosswise of the strip*

From the roller 28 the strip passes between the horizontal line scoring mechanism 30 and the steel roller 29. As the horizontal line scoring mechanism rotates, horizontal lines are scored upon the strip. The spacing of the horizontally scored lines determines the height of each form as indicated in Fig. 4 at 14 and 15. The horizontal line scoring mechanism comprises a shaft 58, Figs. 2 and 16, on which are mounted two disks 77, which are spaced from each other. A plate 78 is bolted on the inside of each disk and the two plates serve to support a block 79 which extends between them. The block 79 has a slot 80 for guiding a radially extending blade 81 having a serrated edge 82 for pressing upon the strip each time the blade 81 comes opposite the smooth steel roller 29, Fig. 1. The serrated blade 81 is pressed outwardly from the block 79 by means of a plurality of springs 83, each of which, together with a plug 84, is contained within a recess in the block. The springs cushion the blade 81 each time it passes the roller 29 and presses upon the strip. The movement of the blade 81 outwardly of its slot is limited by the screws 85 in the block 79. The smooth roller 29 is rotated from the shaft 52 by the gears 57 and 60, Figs. 1 and 3, and the gear 60 drives the gear 59 on the shaft 58 which carries the horizontal line scoring mechanism 30 and its blade 81.

The caption printing mechanism

The heading and other desired printing is applied to the form after the horizontal lines have been scored. The strip passes from the horizontal line scoring mechanism to the printing mechanism comprising the platen 31 and the printing roller 32, Fig. 2. The platen is mounted on the shaft 86 which carries the gear 56, Figs. 1 and 3, which is driven by the gear 55, which, together with the gear 54, is mounted on a stud shaft 87. The gear 55 also drives the gear 88 by which the gear 89 on the printing roller shaft 90 is driven.

Ink is provided for the printing roller 32 through the medium of transfer rolls 91, 92 and 93, Fig. 2. The construction and operation of the printing roller 32 and of the inking mechanism 94 are similar to the ones described in United States Patent 1,563,014, dated November 24, 1925. As illustrated in Fig. 1, the transfer rolls of the inking mechanism 94 are driven from a gear 95 on the driven shaft 72 through a train of gearing including gears 96, 97 and 98.

The locations of the horizontally scored lines and the locations of the printed heading for each form occur on the strip in accordance with the position of the strip with respect to the marking operations of the printing and scoring mechanisms.

For preparing forms of normal length, that is, short forms, the strip passes through all parts of the machine at a constant speed, but when the length of the form is to be greater than the normal length the strip travels at a correspondingly greater speed over the platen 34 and through the punching mechanism 36 and the feed rollers 40 and 41 to the folding mechanism. In the latter case the velocity of the strip moving past the caption printing roller 32 and past the horizontal line scoring device 30 is increased between successive printing and line scoring impressions and reduced to normal velocity during printing and line scoring impressions because the rate of rotation of the printing roller 32 and of the scoring device 30 is always the same. The varying of the velocity of the strip at the printing roller 32 is accomplished by controlling the movement of the adjusting roller 33, Figs. 2, 5 and 6, which is oscillated once for each form to locate the caption and other printed matter correctly on the strip.

Figure 3:
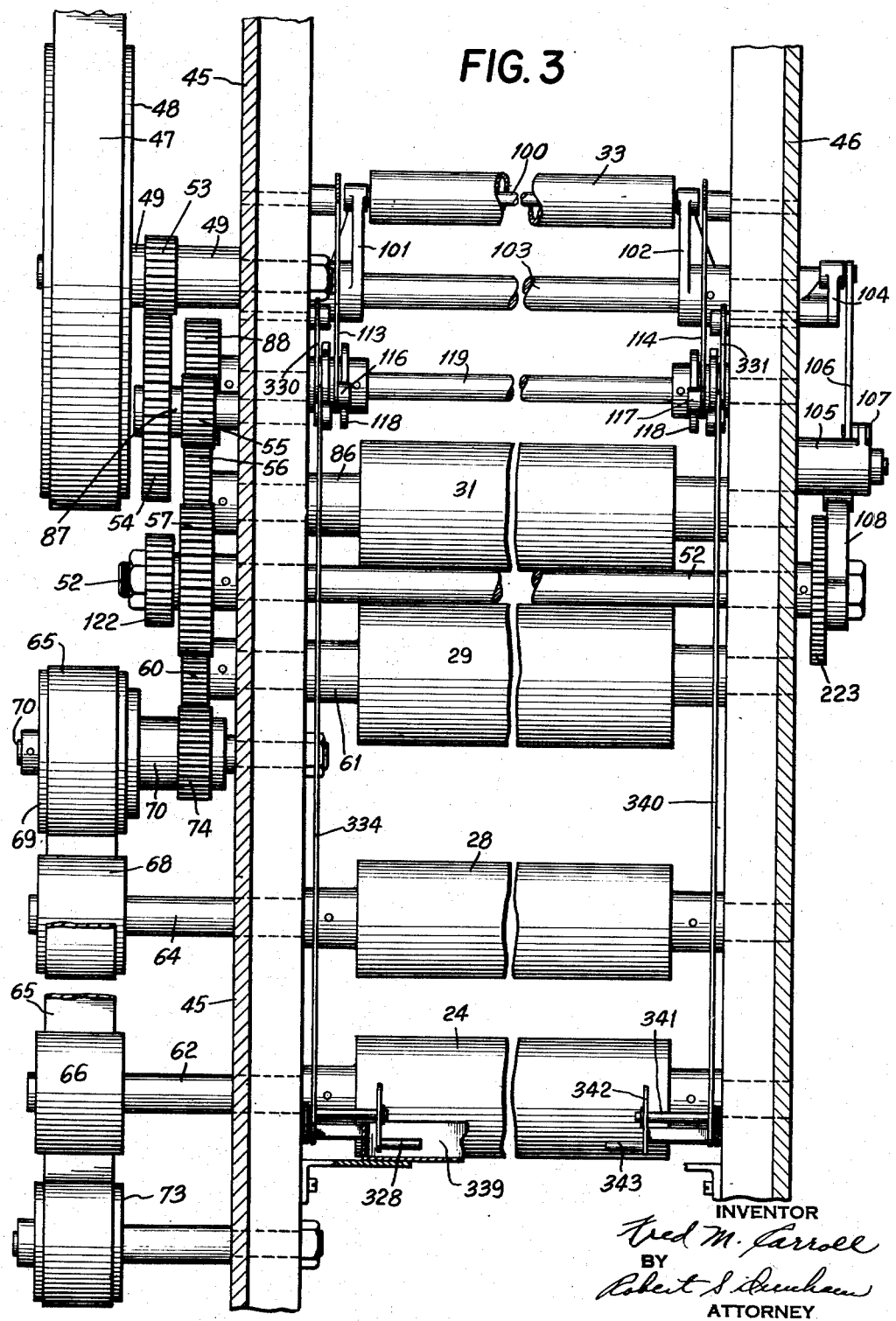
Fig. 3 is a vertical sectional view taken across the machine and illustrating the driving connections for the feed rollers and other driven mechanisms.

The mechanism for bringing about the desired justification for printing and line scoring includes the roller 33 which is freely rotatable on a shaft 100 carried by two arms 101, 102, Fig. 3. These arms are fixed to a rock shaft 103 which also carries an arm 104. The arm 104 is connected to a rocker 105 by means of a link 106. The rocker carries a cam follower 107 which bears upon a cam 108.

Figures 5, 6:
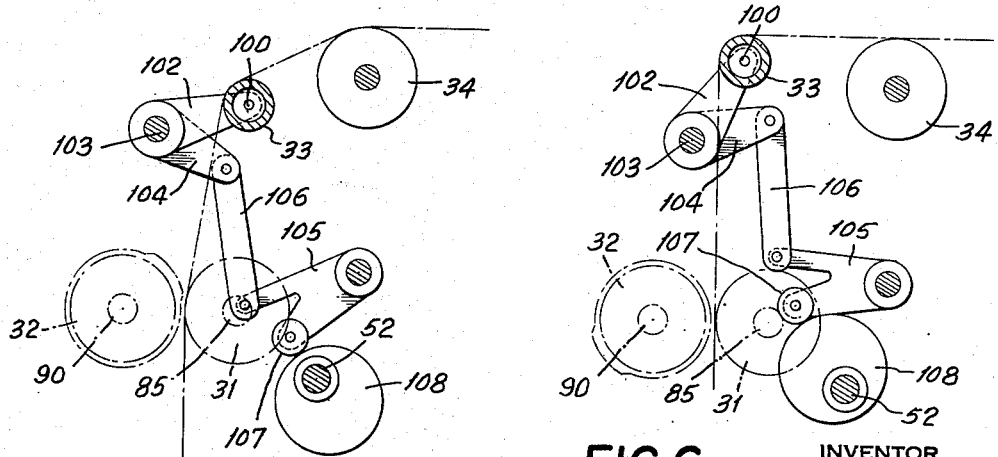
Figs. 5 and 6 illustrate different operational positions of the mechanism by which the rate of travel of the strip between printing impressions is increased when the machine is conditioned to prepare long forms.

The cam 108 is fast to shaft 52 which makes one revolution as the strip advances the distance required to score the two horizontal extending lines 14 and 15 which determine the lower and upper edges of a single form. As shown in Fig. 5, the printing roller 32 has just completed a printing impression for which the adjusting roller 33 has descended at such a rate as to compensate for the velocity of the strip beyond the adjusting roller 33 (as determined by the feed rollers 40 and 41) so as temporarily to establish a velocity of the strip at the printing roller during printing which is equal to the linear velocity of the periphery of the printing roller. The portion of the strip passing the printing roller 32 and of the printing segment have the same linear velocity as printing occurs. After the printing segment has passed the platen 31, the adjusting roller 33 is raised from the position illustrated in Fig. 5 to the position illustrated in Fig. 6 to draw the strip upwardly while the adjusting roller is recovering its uppermost position in order to be ready to reduce the velocity of the strip again the amount required properly to effectuate the next printing impression which occurs once for each revolution of the printing roller 31 and of the cam 108.

Horizontal line scoring is accomplished by the blade 81 of the line scoring device 30 simultaneously with the printing operation.

When it is desired to have forms produced which are of a different height, this can be accomplished by replacing cam 108 with a cam which will actuate the adjusting roller 33 through a greater or lesser arc, while at the same time replacing gear 122 (Fig. 1) with a different sized gear and adjusting the meshing with gear 123 (Fig. 1) as explained below. For producing forms of normal length, i. e. short forms, the cam 108 is replaced by a disk having a circular periphery whereby to hold the roller 33 on a fixed axis in the position illustrated in Fig. 6, and a gear of the proper size is used at the location of gear 122 (Fig. 1) to cause the strip to travel at the correct linear velocity for the printing roller 32 and the horizontal line scoring device 30. Short forms are printed with the strip travelling at a constant velocity throughout the machine.

The mechanism for printing lines crosswise of the strip

In order to print the straight lines 16 crosswise of the strip, a marking cylinder 35 is provided, Figs. 2 and 8. The marking cylinder 35 has a plurality of straight rules located on its surface for this purpose. The marking cylinder is rotatably mounted between a pair of arms 110, 111 (Figs. 2, 7 and 8) which are pivotally supported on a shaft 112. The printing of horizontal lines occurs whenever the marking cylinder 35 is permitted to contact the strip of paper as it passes over the platen 34. Between printing operations the marking cylinder 35 is raised from the strip by means of a pair of pivotally supported levers 113, 114 (see also Fig. 3), which have arms engaging with the lugs 115 which are carried by and extend from the pivoted arms 110 and 111. The levers 113 and 114 carry a cam follower 116 and 117, respectively. The cam followers bear upon similar cams 118 which are fast to the shaft 119. The shaft 119 is driven from the shaft 87 through gears 55 and 88, Fig. 1. The peripheries of the cams 118 are such that the levers 113 and 114 will be rocked clockwise and remain out of engagement with the lugs 115 so long as it is necessary to permit the marking cylinder 35 to contact with the strip for printing the desired number of lines on a particular form. The platen 34 is fastened to a shaft 120 which carries a gear 121. The platen 34 is driven from the shaft 52 through gears 122, 123, 124 and 121. As mentioned above, the gear 122 is changeable for replacement by another gear to obtain a different speed of operation of the platen 34, the punching mechanism 36, the vertical line scoring device 37, the roller 38, and the feed rollers 40 and 41, depending upon whether the machine is to prepare forms of normal length or of greater than normal length. The gear 123 is swingable in an arc about the center of the gear 124 and can be located in any position to mesh with the size of the selected change gear 122.

As illustrated in Fig. 7, the platen shaft 120 carries a gear 125 which engages a gear 126 on the marking cylinder shaft 127 whenever the marking cylinder is in contact with the strip of paper for printing purposes. Gear 125 also meshes with a gear 128 by which the rolls which supply ink to the marking cylinder 35 are driven. The ink is obtained from a rubber roll 129 (Fig. 8) which takes ink from a supply hopper 130. The roll 129 is rotated by ratchet wheel 131 and a pawl 132 which cooperates with the ratchet wheel, Fig. 7. The pawl 132 is attached to one arm of a fork-shaped member 133 which is pivotally mounted on a shaft 134. The other arm of the member 133 carries a roller 135 which follows the periphery of a cam 136 and causes the fork-shaped member 133 to oscillate and advance the rubber roll 129 step by step. The cam 136 is mounted on a shaft 137 which is driven from the gear 128 through gears 138, 139 and 140. The gear 136 also meshes with the gear 141 which is fast to a shaft 143 upon which the roll 144 is mounted, Fig. 8. The rubber roll 145 is removably mounted on brackets 146 which extend from the fork-shaped member 133. As the fork-shaped member oscillates the rubber roll 145 alternately moves into contact with the roll 129, and the roll 144, thereby transferring ink to roll 144. The intermediate roll 144 transfers ink to roll 147 which in turn transfers the ink to the marking cylinder 35. The marking cylinder 35 receives ink from the inking roll 147 each time the marking cylinder is lowered to mark or print lines on the strip passing over the platen 34. Between successive marking operations the marking cylinder is held away from the strip and out of contact with the inking roll 147 by the cams 118 and the levers 113 and 114. The roll 147 is removably mounted at its ends on brackets 148 pivotally mounted on studs 149. The roll 147 is urged against the roll 144 by springs 150 which extend between the brackets 148 and the studs 151.

So as to distribute the ink evenly over the marking cylinder, the intermediate roll 144 is reciprocated axially of itself while it is being rotated. This is accomplished by a pair of cam-operated levers supported on the side frames of the machine. One of these levers is illustrated in Fig. 9. Each lever 153 is pivotally mounted on a stud 154 carried by a bracket 155. One end of the lever 153 abuts the end of the roll shaft 143 and the other end of the lever carries a roller 156 which engages a plate cam 157. The plate cam 157 is supported on and rotated by the shaft 137. As the cam 157 rotates the lever 153 is rocked and the shaft of roll 144 is moved longitudinally of its axis in one direction. A cam, complementary to the cam 137, is carried by the other end of the roll shaft 143. A similar cam-operated lever is alternately acted upon by the complementary cam to move the shaft in the opposite direction.

The punching mechanism

The punching mechanism 36, Figs. 1 and 2, by which the lines of perforations 17 and 18 are punched into the strip along its marginal edges is illustrated in greater detail in Figs. 10, 11 and 12. The punching mechanism has two complete punching units 160 and 161, one for punching the holes at one edge of the strip and the other for punching the holes at the other edge of the strip. Except for the fact that the two rotatable heads 162 and 163 rotate in opposite directions, these two punching units are similar, and it will suffice to describe one of them.

The punching unit includes a base 164 and a cover portion 165 which are fastened together. The base 164 is supported from a pair of parallel bars 166 and 167 and is held in place thereon by a clamping screw 168. The head 162 is supported to rotate about a vertically disposed stud shaft 169 which is carried by the base 164. The head 162 is mounted upon bearings 170 and 171. The head 162 carries a plurality of punches 172 which are arranged in a circle, Fig. 10. Each punch 172 is slidably mounted within a bore and is normally supported by means of a leaf spring 173, Fig. 11. A die plate 174 is fastened to the head 162 by a number of screws 175. The die plate has a plurality of die holes 176 which are axially located with respect to the several punches 172.

The travel of the axis of a punch located adjacent to the strip corresponds to the linear movement of the strip passing between the axes of the two rotating heads 162 and 163. The head 162 is driven from a bevel gear 178 which meshes with the gear teeth 179 on the head 162. Bevel gear 178 is carried by a shaft 180 which has a spur gear 181 keyed to its other end. The gear 181 meshes with a gear train which is driven from the shaft 52 (Fig. 1) and includes gears 122, 123, 124, 182, 183, 184, 185 (Fig. 10) 186, 187 and 181. Gears 184 and 185 are mounted on a shaft 188 by which the rotating head 163 is driven through gears 189, 190, 191 and 192. The head 162 is rotated clockwise and the head 163 is rotated counterclockwise as seen from above.

The punches 172 are actuated individually as they come opposite the edge of the strip. This is accomplished by means of a cam 193 which is carried by shaft 180. The cam 193 carries a number of projections which successively come into contact with the punches 172 as each punch comes into punching position, as illustrated in Fig. 12. When the head 162 has carried the actuated punch beyond the axis of shaft 180, the punch which has been actuated is released from coaction with the cam and is withdrawn by its leaf spring 173. As the strip travels between the punching heads and the die plates, rows of perforations 17 and 18 are made in the strip.

The mechanism for scoring the strip longitudinally

The longitudinally scored lines 19 and 20 are produced by means of circular disks 195 and 196

(Fig. 10), disk 195 being mounted on shaft 197 which receives its rotation through the gear 190, and the disk 196 being mounted on shaft 198 which receives its rotation through the gear 186. Each of the disks has a serrated knife edge which presses upon the strip as the strip passes over freely rotatable rollers 199, one of which is shown in Fig. 12. A roller 199 is mounted upon a bracket 200 which is pivotally mounted upon a stud shaft 201 fastened to the base 164. The pressure of the roller 199 on the disk 195 and the intervening strip of paper may be adjusted by means of a screw 202 by which the tension in the spring 203 is controlled. The roller 204 which cooperates with the disk 196 is similarly constructed and supported. The spacing between the punching units and the longitudinal scoring devices can be adjusted by sliding the units 160 and 161 along rods 166 and 167 to whch they are secured by means of the screws 168.

*The mechanism for printing lines longitudinally of the strip*

The mechanism by which the vertical lining 21 of the forms is accomplished includes several ruling pens similar to the pen 205, Fig. 2, which are mounted upon a square shaft or bar 206 having turned down ends 207 for pivotally supporting the shaft in the frames of the machine. An arm 208 is secured to the shaft. The arm 208 carries a cam follower 209 which bears upon a cam 210 carried by the shaft 211. The shaft 211 is driven from the gear 133 by means of gears 212, 213, Fig. 1. The pens are permitted periodically to descend upon the strip as the strip passes over the roller 38 to mark lines on the strip of such length as is desired. The length of the line is determined by the extent of the low portion of the cam 210. When the cam follower 209 is raised by the high portion of the cam, the pens are lifted from the strip and held away from the strip until the strip has advanced the distance necessary for initiating the marking of the next form. There are as many pens spaced along the bar 206 as are required to produce the desired number of vertical lines. When the strip leaves the roller 38 it appears as illustrated in Fig. 4, all of the printing, scoring and punching having been completed. There remains only to fold the strip and to stack it.

Upon leaving the roller 38, Fig. 2, the strip passes between two feed rollers 40 and 41 which grip and feed the strip to the folding mechanism, Figs. 2, 13, 14 and 15. The feed roller 40 is driven from the train of gearing. The roller 41 is free running and is resiliently pressed against the strip and the roller 40. The roller 40 is carried by a shaft 214 to which a gear 215 is fastened, Fig. 1. The gear 215 is driven from the shaft 52 by the change gear 122, and gears 123, 124 and 132.

*The folding mechanism*

The strip is folded in zigzag fashion, as illustrated in Fig. 2, and the lines of fold coincide with the horizontally scored lines 14 and 15. Every alternate fold is produced by a tucking blade 217 which tucks a fold of the paper between a pair of nipping rollers 218, 219 which are carried by a drum 220. There are four pairs of rollers 218, 219, mounted upon the drum 220 at 90° intervals, and the tucking blade 217 is oscillated four times for each revolution of the drum. Upon each oscillation of the tucking blade every other fold of the strip is tucked between successive pairs of rollers 218 and 219. The drum 220 is loosely mounted on the shaft 221. The drum carries a gear 222, Fig. 1, which is driven from the shaft 52 through the gears 223, 224, 225, which latter gear meshes with the gear 222. The cams 238 and 240 which control the action of the tucking blade 217 are fixed to shaft 221 which carries a gear 226. The gear 226 is driven from the gear 224 through an intermediate gear 227, Fig. 1. The speed ratio between the shaft 221 and the drum is four to one and they retain the same speeds whether the machine is set for producing forms of normal length or of greater than normal length.

The tucking blade 217 is mounted upon an arm 229 which is carried by a sleeve 230, Fig. 13. The sleeve is mounted for oscillation about a shaft 231 which is carried by a pair of arms 232 which are mounted to rock about the shaft 221. A bell crank 234, pivoted at 235, is connected to the arm 232 by a link 236. The bell crank 234 carries a cam follower 237 which bears upon a cam 238 which is fast to shaft 221. The cam follower 237 is held against the periphery of the cam 238 by means of a spring 239. As the cam 238 rotates the arm 232 and the tucking blade 217 are moved in a circular arc about the shaft 221. As the tucking blade 217 moves clockwise, Fig. 13, it is rocked about the pivot 231 to fold the strip between a pair of rollers 218 and 219 of the drum. This is accomplished by cam 240 which engages a cam follower 241 at the end of an arm 242, which is secured to the sleeve 230. The cam follower 241 is maintained in contact with the periphery of the cam 240 by means of a spring 242'. When the cam followers 241 and 237 clear the high points on their respective cams, the tucking blade 217 is lifted from tucking position and is returned to its starting position.

The drum 220 and the rollers 218 and 219 carry the seized portion of the strip as the drum rotates and until the rollers are spread apart, Fig. 15. The roller 218 is mounted upon a frame 243 which is pivotally supported on a shaft 244 carried by the drum. The roller 218 is normally pressed against the roller 219 by the action of a spring 245 which extends between the frame 243 and the drum. Each pair of rollers 218, 219, are separated once during a revolution of the drum. The shaft 244 carries a lug 246 which is adapted to be engaged by a pin 247 extending from the side frame of the machine for causing the release of the gripped strip. The pin 247 is so located that it will be engaged by the lug 246 and cause rotation of the lug and of the frame 243 to relieve the roller 218 from pressing engagement with the strip and with the roller 219 when the gripped strip is to be released.

As the pair of rollers 218 and 219 travel from strip-engaging to strip-disengaging positions, a length of the strip equal to the length of two forms is advanced by the feed rollers 40 and 41, and the portion of the strip including the intermediate fold 248 is projected away from the drum by a pair of air jets 249, as illustrated in Fig. 2. This projected portion of the strip expands into a loop which extends towards and over a pair of guides 250 and 251, Figs. 13 and 14. In order to assist the travel of the extended loop in the proper direction, there is provided an endless belt 252 which is carried by a pair of rollers 253, 254. The roller 254 is mounted upon a shaft 255 to which a gear 256 is fixed, Fig. 1. Gear 256 is driven from the gear 183 through an intermediate gear 257.

The loop extending between successive pairs of rollers 218 and 219 extends over the guides 250 and 251 and onto a shelf 260 which is supported by a pair of arms 261 pivotally mounted upon a shaft 262, Fig. 13. The guides 250 and 251 and the shelf 260 are subsequently removed from strip-supporting position to permit the folded strip to drop into the stacker 42. Before the rails and the shelf are operated to permit this to happen, the strip is folded along the intermediate horizontally scored line separating adjacent forms. This is accomplished by a creasing blade 263 which is fastened to a rock shaft 264. The rock shaft 264 carries an arm 265 which is pivotally connected to a bell crank 266 by a link 267. The bell crank 266 carries a cam follower 268 which is pressed by a spring 269 into contact with a cam 270 which is fixed to the shaft 221. While the forward end of the intermediate loop portion is supported upon the shelf 260, the creasing blade 263 is caused to bear down upon the folded strip and press the same against the shelf 260. This is accomplished as the cam follower 268 drops from the high portion of the cam 270 and permits the bell crank 266 to be rocked clockwise, Fig. 13. Following the creasing operation the bell crank 266 is rocked counterclockwise and the creasing blade 263 is raised to the position illustrated in Fig. 13.

After the strip has been creased, the shelf 260 is rocked away from strip-supporting position. This is accomplished by a cam 271 cooperating with the cam follower 272 mounted on an arm 273 which is pivoted to rock on shaft 274. The arm 273 is integral with the arm 275 which is connected to an arm 276 by a link 277. The arm 276 is carried by the shaft 262. A spring 278 maintains the cam follower 272 in contact with the periphery of the cam 271 and as the cam follower 272 dips into a dwell in the cam 271, the arm 275 rocks clockwise and actuates the shaft 262 counterclockwise and causes the arms 261 and the shelf 260 to be removed from beneath the folded portion of the strip. The guides 250 and 251 are at the same time moved away from each other so as to permit the folded strip to drop into the stacker 42. This action is accomplished as the arm 279, which is integral with the arms 273 and 275, is rocked clockwise.

The motion of the arm 279 is transmitted to the guides 250 and 251 by a link 280, Figs. 13 and 14, whose upper end is fastened to an arm 281 on the shaft 282. When the cam follower 272 rolls onto the low portion of the cam 271, the link 280 is pulled down and the shaft 282 is rocked counterclockwise, as seen in Fig. 13. The shaft 282 carries an arm 283 to which a link 284 is attached. The shaft 282 also carries an arm 285 to which a link 286 is attached. The link 284 is pivotally connected to a bracket 287 which is slidably mounted upon a pair of rods 288 and 289. The link 286 is pivotally connected to a bracket 290, which also is slidably mounted on the rods 288 and 289. The guides 250 and 251 are carried by the slidably mounted brackets 287 and 290, respectively. It is therefore apparent that when the link 280 is pulled downwardly and the shaft 282 is rocked counterclockwise, Fig. 13, the two guides 250 and 251 and their supporting brackets are moved away from each other. Immediately upon releasing the folded sheet the guides 250 and 251 are restored to their strip-supporting positions by the action of the cam 271. The foregoing operations occur four times during a complete revolution of the drum 220, during which eight complete forms are folded and deposited in the stacker box 42.

The mechanism for aligning the webs

As previously explained, the strip of continuous forms which has been prepared and folded, is made up of two webs, a web of plain paper 10 and a web of carbon paper 11, Fig. 2. The plain web 10 is received over an aligning roller 23 and the carbon web is received over an aligning roller 25, Figs. 2 and 17. The aligning rollers are similarly supported and controlled for aligning the two webs. The aligning roller 23 carries stud shafts 294, 295, one at each end. The stud shafts of the roller 23 are mounted on levers 296, 297, respectively, and the levers are individually mounted on stud shafts 298 and 299, which extend from the side frames of the machine. The forward end of the lever 296 is supported by the armature 300 of the solenoid 301 and the forward end of the lever 297 is similarly supported by the solenoid 302. The solenoids are supported from the side frames by brackets. The roller 25 is similarly mounted on levers 303 and 304 which are in turn respectively mounted on stud shafts 305 and 306 and are normally supported by the armatures of the solenoids 307 and 308.

The levers 296 and 303 are connected together by a spring 309, and a spring 310 similarly connects the levers 304 and 297. These springs bias the ends of the rollers 23 and 25 downwardly against the support provided by the armatures. So long as the webs are in correct alignment, all of the solenoids remain deenergized. Whenever one or the other of the webs gets out of alignment, it is restored to alignment by the raising of an end of the one or the other of the aligning rollers over which the particular misaligned web is passing. Alignment of the paper is restored by throwing the roller out of alignment and thereby causing the paper to travel on the roller. This is accomplished by energizing the solenoid at the edge of the strip towards which movement of the strip is desired. A switch is provided for each solenoid. The switch is best shown in Figs. 18 and 19. Each switch is supported from a side wall of the machine, as illustrated in Fig. 18. The switch includes two conducting strips 313 and 314 which, together with a cantilever spring member 315, are supported on an insulated block 316. The conducting strip 313 is normally held against a stop 317. The forward end of the strip 314 is engaged in a groove within the cam 318 which is mounted on a shaft 319. The shaft 319 is journaled in bearings 320 and 321 and extends outwardly of the cover 322. The shaft 319 carries a sensing lever 323 which has a surface 324 disposed at right angles to the edge of the web 10 (or 11). One end of a spring 326 is secured to the cam 318, and its other end is supported by a screw 327 which is adjustably set to have the spring maintain the face of the sensing lever 323 in contact with the edge of the web when the web is in correct alignment. If the web becomes misaligned towards the left, as illustrated in Fig. 11, it will allow the sensing lever 323 to move to the left and thereby rotate the shaft 319 in a counterclockwise direction and cause the contact 329 between the conductor strips 313 and 314 to close. When the contact closes its associated solenoid is energized. This causes the end of the aligning roller adjacent the particular sensing lever which has become displaced to be lifted, with the result that the roller is misaligned sufficiently to cause re-alignment of the web. As re-alignment occurs, the web moves against the sensing lever and causes the circuit of the particular solenoid concerned to be opened. All of the four solenoids and their associated switches operate similarly to control the tension of the webs 10 and 11 for the purpose of bringing them together in correct alignment when they reach the feeding roller 24.

*The gluing mechanism*

After the web of plain paper 10 and the web of carbon paper 11 pass from the aligning rollers 23 and 25, the webs are spot-glued together along their marginal edges. The glue is applied outside of the vertically scored sines 19 and 20. The mechanism by which the glue is applied includes a pair of levers 330, 331, Figs. 2 and 3, each pivoted to a side frame of the machine. Each lever carries a cam follower 332 which engages a cam 333 on the shaft 119. The lever 330 has pivotally connected to its end a link 334 whose other end is pivotally connected to a pivoted arm 335. The arm 335 is mounted upon a shaft 336 which carries a goose neck arm 337. Mounted on the end of the arm 337 is a roller 338 which extends into a tray 339 containing glue. The lever 331, companion to the lever 330, is connected to a link 340, Fig. 3, which is connected to an arm for rocking the shaft 341, the goose neck arm 342 and the roller 343 at the other edge of the strip. As the shaft 119 rotates, the glue-applying rollers 338 and 343 are periodically raised into contact with the underside of the carbon web 11. In this manner spots of glue are applied to the carbon web as it travels past the gluing device. The two webs are brought together as they pass over the feeding roller 24.

The operation of the machine will be apparent to those skilled in the art in view of the foregoing disclosure. In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted without interfering with the more general results outlined, and the invention, within the scope of the appended claims incident to such use.

What is claimed is:

1. A machine of the class described comprising means for feeding a strip of material through a machine, means for transversely scoring the strip at intervals along its length, said scoring means having a given peripheral velocity, means for marking the strip with horizontal lines at intervals along its length, said marking means including a laterally movable marking cylinder and a platen, means for driving said feeding means to feed said strip at the same velocity as the peripheral velocity of said marking means, cyclically operable means for varying the velocity of said strip past said scoring means, means for operating said cyclic means to cause the velocity of said strip past the scoring means to equal the peripheral velocity of said scoring means while the scoring operation is being effectuated, and means controlling the lateral movement of said marking cylinder into and out of marking relationship with the strip in timed relation to the rate of feed of the strip to mark lines on the strip in spaced relation to the scored lines.

2. A machine of the class described comprising means for feeding a strip of material through a machine, means for transversely scoring the strip at intervals along its length, means for printing information on the strip at intervals along its length, said scoring and printing means having a given peripheral velocity, means for marking the strip with horizontal lines at intervals along its length, said marking means including a laterally movable marking cylinder and a platen, means for driving said feeding means to feed said strip at the same velocity as the peripheral velocity of said marking means, cyclically operable means for varying the velocity of said strip past said scoring and printing means, means for operating said cyclic means to cause the velocity of said strip past the scoring and printing means to equal the peripheral velocity of said scoring and printing means while the scoring and printing operations are being effectuated, line scoring means and printing means, and means controlling the lateral movement of said marking cylinder into and out of marking relationship with the strip in timed relation to the rate of feed of the strip to mark lines on the strip in spaced relation to the scored lines and printed information.

3. A machine of the class described comprising means for feeding a strip of material through a machine, means for transversely scoring the strip at intervals along its length said scoring means having a given peripheral velocity, means including a marking cylinder for marking lines across the strip, means for periodically actuating said last-named means for marking groups of lines in spaced relation to each other, means controlling the duration of operation of said marking cylinder for determining the number of lines in each group of lines marked on the travelling strip, means for driving said feeding means to feed said strip at the same velocity as the peripheral velocity of said marking cylinder means, cyclically operable means for varying the velocity of said strip past said scoring means, means for operating said cyclic means to cause the velocity of said strip past the scoring means to equal the peripheral velocity of said scoring means while the scoring operation is being effectuated, and means driven by said driving means for controlling the actuation of said actuating means for spacing the group of lines marked upon said strip with respect to the scored lines.

4. A machine of the class described comprising means for feeding a strip of material through a machine, means for printing information on the strip at intervals along its length, said printing means having a given peripheral velocity, means including a marking cylinder for marking lines across the strip, means for periodically actuating said last-named means for marking groups of lines in spaced relation to each other, means controlling the duration of operation of said marking cylinder for determining the number of lines in each group of lines marked on the travelling strip, means for driving said feeding means to feed said strip at the same velocity as the peripheral velocity of said marking means, cyclically operable means for varying the velocity of said strip past said printing means, means for operating said cyclic means to cause the velocity of said strip past the printing means to equal the peripheral velocity of said printing means while the printing operation is being effectuated, and means driven by said driving means for controlling the actuation of said actuating means for spacing the group of lines marked upon said strip with respect to the information printed on said strip.

5. A machine of the class described comprising means for feeding a strip of material through a machine, means for printing information on the strip at intervals along its length, said printing means having a given peripheral velocity, means for periodically marking the strip with horizontal lines, said marking means including a laterally movable marking cylinder and a rotatable platen, means for actuating said marking cylinder for marking lines on the strip, means for driving said feeding means to feed said strip at the same velocity as the peripheral velocity of said marking means, cyclically operable means for varying the velocity of said strip past said printing means, means for operating said cyclic means to cause the velocity of said strip past the printing means to equal the peripheral velocity of said printing means while the printing operation is being effectuated, and means controlling the lateral movement of said marking cylinder to mark lines on the strip in spaced relation to the printed information on the strip.

6. A machine of the class described comprising means for feeding a strip of material through a machine, means for transversely scoring the strip at intervals along its length, said scoring means having a given peripheral velocity, means for periodically marking the strip with horizontal lines, said marking means including a marking cylinder pivotally mounted with respect to a rotatable platen, means for periodically raising and lowering said marking cylinder with respect to said platen, means for rotating said marking cylinder to mark horizontal lines on said strip as said strip travels over said platen, means for driving said feeding means to feed said strip at the same velocity as the peripheral velocity of said marking cylinder and platen, cyclically operable means for varying the velocity of said strip past said scoring means, means for operating said cyclic means to cause the velocity of said strip past the scoring means to equal the peripheral velocity of said scoring means while the scoring operation is being effectuated, and means controlling the operation of said marking cylinder to mark lines on the strip in spaced relation to the scoring on the strip.

7. A machine of the class described comprising means for feeding a strip of material through a machine, a roller, a line scoring device including a serrated blade mounted for rotation alongside said roller, a platen, a printing roller mounted alongside said platen for printing upon a strip passing between said platen and said printing roller, said roller, line scoring device, platen and printing roller having a given peripheral velocity, a second platen, a line printing cylinder mounted opposite said second platen, means for periodically lowering said line printing cylinder into contact with the strip passing between said printing cylinder and said second platen, means for driving said strip feeding means to feed said strip at the same velocity as the linear velocity of the peripheries of the second platen and line printing cylinder, cyclically operable means for varying the velocity of said strip past the roller, line scoring device, platen and printing roller, and means for operating said cyclic means to cause the velocity of said strip past the roller, line scoring device, platen and printing roller to equal the peripheral velocity of said roller, line scoring device, platen and printing roller while the printing roller while the printing and line scoring operation is being effectuated.

8. A machine of the class described comprising means for feeding a strip of material through a machine, a roller, a line scoring device including a serrated blade mounted for rotation alongside said roller, a platen, a printing roller mounted alongside said platen for printing upon a strip passing between said platen and said printing roller, said roller, line scoring device, platen and printing roller having a given peripheral velocity, a second platen, a line printing cylinder mounted opposite said second platen, means for periodically lowering said line printing cylinder into contact with the strip passing between said printing cylinder and said second platen, means driven from said second platen for rotating said printing cylinder when said printing cylinder is lowered to printing position, means for driving said strip feeding means to feed said strip at the same velocity as the linear velocity of the peripheries of the second platen and line printing cylinder, cyclically operable means for varying the velocity of said strip past the roller, line scoring device, platen and printing roller, and means for operating said cyclic means to cause the velocity of said strip past the roller, line scoring device, platen and printing roller to equal the peripheral velocity of said roller, line scoring device, platen and printing roller while the printing and line scoring operation is being effectuated.

9. A machine of the class described comprising means for feeding a strip of material through a machine, means for printing information on the strip at intervals along its length, said printing means having a given peripheral velocity, line printing mechanism comprising a rotatable platen and a marking cylinder movably mounted for intermittent cooperation with said platen for printing lines at intervals along said strip, means for rotating said platen and said marking cylinder at the same peripheral velocity, means for driving said strip feeding means to feed said strip at the same velocity as the linear velocity of the peripheries of said platen and marking cylinder, cyclically operable means for varying the velocity of said strip past said first-named printing means and means for operating said cyclic means to cause the velocity of said strip past said first-named printing means to equal the peripheral velocity of said first-named printing means while the printing operation is being effectuated.

10. A machine of the class described comprising means for feeding a strip of material through a machine, means for transversely scoring the strip at intervals along its length, said scoring means having a given linear velocity during the scoring operation, line printing mechanism comprising a rotatable platen and a marking cylinder movably mounted for intermittent cooperation with said platen for printing lines at intervals along said strip, means for rotating said platen and said marking cylinder at the same peripheral velocity, means for driving said strip feeding means to feed said strip at the same velocity as the linear velocity of the peripheries of said platen and marking cylinder, cyclically operable means for varying the velocity of said strip past said scoring means, and means for operating said cyclic means to cause the velocity of said strip past said scoring means to equal the given linear velocity while the scoring is being effectuated.

11. A machine of the class described comprising means for feeding a strip of material through a machine, means for transversely scoring the strip at intervals along its length, said scoring means having a given linear velocity during the scoring operation, means for punching a series of holes lengthwise of the strip, means for operating said punching means for punching the holes at the rate of speed at which the strip passes said punching means, means cyclically operable for varying the velocity of the strip past said scoring means during part of an operation cycle and between scoring operations, means controlling said cyclic means for causing the velocity of said strip past said scoring means to be equal to the given linear velocity while the scoring operation is under way, and means for operating said scoring means at a constant speed.

12. A machine of the class described comprising means for feeding a strip of material through a machine, means for printing on the strip at intervals along its length, said printing means having a given peripheral velocity, means for punching a series of holes lengthwise of the strip, means for operating said punching means for punching the holes at the rate of speed at which the strip passes said punching means, cyclically operable means for varying the velocity of the strip past said printing means during part of an operation cycle and between printing operations, means for operating said cyclic means to cause the velocity of said strip past said printing means to equal the peripheral velocity of said printing means during the printing operations, and means for operating said printing means at constant speed.

13. A machine of the class described comprising means for feeding a strip of material through a machine, means for transversely scoring the strip at intervals along its length, means for printing on the strip at intervals along its length, each said scoring means and said printing means having a given peripheral velocity and both said velocities being equal to one another, means for actuating said scoring means and printing means, punching mechanism for punching a series of holes along said strip, means for advancing said strip through said punching mechanism and for actuating said punching mechanism at a constant speed, cyclically operable means for varying the rate of speed of said strip in advance of said punching mechanism during part of an operation cycle and means for controlling said cyclic means to cause the velocity of said strip in advance of said punching mechanism to equal said given velocities during the printing and scoring operations.

14. A machine of the class described comprising punching mechanism for punching a series of holes lengthwise of a moving strip of material, means for feeding the strip through said punching mechanism at a given speed, means for printing on the strip at intervals, said printing means including a rotatable printing roller and a rotatable platen, means for rotating said rotatable printing roller and platen at a constant peripheral speed, cyclically operable means for periodically varying the velocity of the strip past said printing means during part of an operation cycle and between printing operations, means controlling said cyclic means to cause the velocity of the strip past said printing means to be equal to said constant peripheral speed during printing operations, and means for operating said punching mechanism for punching holes longitudinally of the strip said given speed of the strip being greater than said constant peripheral speed.

15. A machine of the class described comprising punching mechanism for punching a series of holes lengthwise of a moving strip of material, means for feeding the strip through said punching mechanism at a given constant speed, means for printing on the strip at intervals, said printing means including a rotatable printing roller and a rotatable platen, means for rotating said rotatable printing roller and platen at a constant peripheral speed different from the feed of the strip through said punching mechanism, means for compensating for the difference in rates of travel of the strip through the punching mechanism and between the printing roller and platen at the time of printing, said compensating means including an adjustably mounted roller engaged by the strip as it travels from said printing means to said punching mechanism and a cam for oscillating said roller during part of an operation cycle, and operating means for said punching mechanism, printing means and cam, said cam having a shape such that the strip will have a rate of travel between the printing roller and platen equal to the constant peripheral speed of the printing roller and platen at the time of printing while having a different rate of travel between the printing roller and platen during the time when the printing operation is not taking place.

16. A machine of the class described comprising means for feeding a strip of material through a machine, means for scoring lines longitudinally of the strip, means for transversely scoring the strip at intervals along its length, means for printing on the strip at intervals along its length, each said scoring means and said printing means having a given peripheral velocity and both said velocities being equal to one another, means for actuating said scoring means and printing means, punching mechanism for punching two series of holes in rows lengthwise of the moving strip of material, said punching mechanism comprising a pair of similar punching units located one at each edge of the moving strip, each unit including a rotatable punching head carrying a plurality of punches and dies arranged circularly with respect to the axis of the punching head, means to actuate said punches one at a time to punch holes within marginal areas of the strip as the punching heads rotate, means for guiding the strip tangentially to the circles of punches and dies and between the punches and dies of said punching heads and through said line scoring means, means for advancing said strip through said punching mechanism and for actuating said punching mechanism at a constant speed, cyclically operable means for varying the rate of speed of said strip in advance of said punching mechanism during part of an operation cycle and means for controlling said cyclic means to cause the velocity of said strip in advance of said punching mechanism to equal said given velocities during the printing and scoring operations.

References Cited in the file of this patent

UNITED STATES PATENTS

| Number | Name | Date |
|---|---|---|
| 882,283 | Wolfe | Mar. 17, 1908 |
| 924,794 | Klein | June 15, 1909 |
| 1,015,580 | Nichols | Jan. 23, 1912 |
| 1,034,637 | Meisel | Aug. 6, 1912 |
| 1,153,045 | Dupuis | Sept. 7, 1915 |
| 1,153,046 | Dupuis | Sept. 7, 1915 |

(Other references on following page)

UNITED STATES PATENTS

| Number | Name | Date |
|---|---|---|
| 1,200,758 | Pringle | Oct. 10, 1916 |
| 1,473,650 | Sheldon | Nov. 13, 1923 |
| 1,646,034 | Mayer | Oct. 18, 1927 |
| 1,797,354 | Marquardt | Mar. 24, 1931 |
| 1,910,359 | Paulsen | May 23, 1933 |
| 1,984,737 | Gerster | Dec. 18, 1934 |
| 1,986,643 | Mueller | Jan. 1, 1935 |
| 2,040,158 | Turk | May 12, 1936 |
| 2,054,763 | Wulf | Sept. 15, 1936 |
| 2,148,586 | Scudds | Feb. 28, 1939 |
| 2,151,028 | Hayward | Mar. 21, 1939 |
| 2,154,157 | Fulk | Apr. 11, 1939 |
| 2,220,270 | Page | Nov. 5, 1940 |
| 2,262,919 | Bruker | Nov. 18, 1941 |
| 2,395,983 | Wyrick | Mar. 5, 1946 |
| 2,522,784 | Guilbert | Sept. 19, 1950 |
| 2,546,372 | Pinckert | Mar. 27, 1951 |